United States Patent
Kerestecioglu et al.

(10) Patent No.: US 10,245,549 B2
(45) Date of Patent: Apr. 2, 2019

(54) METHOD AND DEVICE FOR SEPARATING OFF ELECTROLYTES FROM SYNTHESIS GASES

(71) Applicant: LINDE AKTIENGESELLSCHAFT, Munich (DE)

(72) Inventors: Ulvi Kerestecioglu, Geltendorf (DE); Jan-Peter Bohn, Stamberg (DE)

(73) Assignee: LINDE AKTIENGESELLSCHAFT, Munich (DE)

(*) Notice: Subject to any disclaimer, the term of this patent is extended or adjusted under 35 U.S.C. 154(b) by 191 days.

(21) Appl. No.: 15/245,476

(22) Filed: Aug. 24, 2016

(65) Prior Publication Data
US 2017/0080377 A1    Mar. 23, 2017

(30) Foreign Application Priority Data
Sep. 17, 2015    (DE) .......... 10 2015 012 213

(51) Int. Cl.
*B01D 53/14* (2006.01)
*B01D 53/18* (2006.01)

(52) U.S. Cl.
CPC ......... *B01D 53/1406* (2013.01); *B01D 53/14* (2013.01); *B01D 53/18* (2013.01); *B01D 2252/103* (2013.01); *B01D 2256/16* (2013.01); *B01D 2256/20* (2013.01); *B01D 2257/2045* (2013.01); *B01D 2257/406* (2013.01)

(58) Field of Classification Search
CPC .............................................. B01D 2252/103
See application file for complete search history.

(56) References Cited

U.S. PATENT DOCUMENTS

| | | | | |
|---|---|---|---|---|
| 4,552,572 A | * | 11/1985 | Galstaun | B01D 53/14 95/161 |
| 2012/0107208 A1 | * | 5/2012 | Ohara | F23J 15/006 423/239.1 |
| 2013/0186272 A1 | * | 7/2013 | Balfe | B01D 53/1406 95/228 |
| 2014/0234176 A1 | * | 8/2014 | Gal | C10L 3/103 422/170 |
| 2016/0312137 A1 | * | 10/2016 | Bohn | C10K 1/004 |
| 2017/0361264 A1 | * | 12/2017 | Meyer | C01B 3/52 |

* cited by examiner

*Primary Examiner* — Matthew J Merkling
(74) *Attorney, Agent, or Firm* — Millen White Zelano & Branigan, PC

(57) ABSTRACT

A method and a device for separating off an electrolyte from a first synthesis gas and a second synthesis gas, each containing an electrolyte. The two synthesis gases are each subjected in a scrubbing column to a water scrubbing, in which a substantially electrolyte-free synthesis gas and also a scrubbing water loaded with an electrolyte that has been separated off are obtained. At least a part of the scrubbing water that was loaded with an electrolyte that has been separated off in the scrubbing of the first synthesis gas is used as scrubbing medium in the scrubbing of the second synthesis gas.

9 Claims, 1 Drawing Sheet

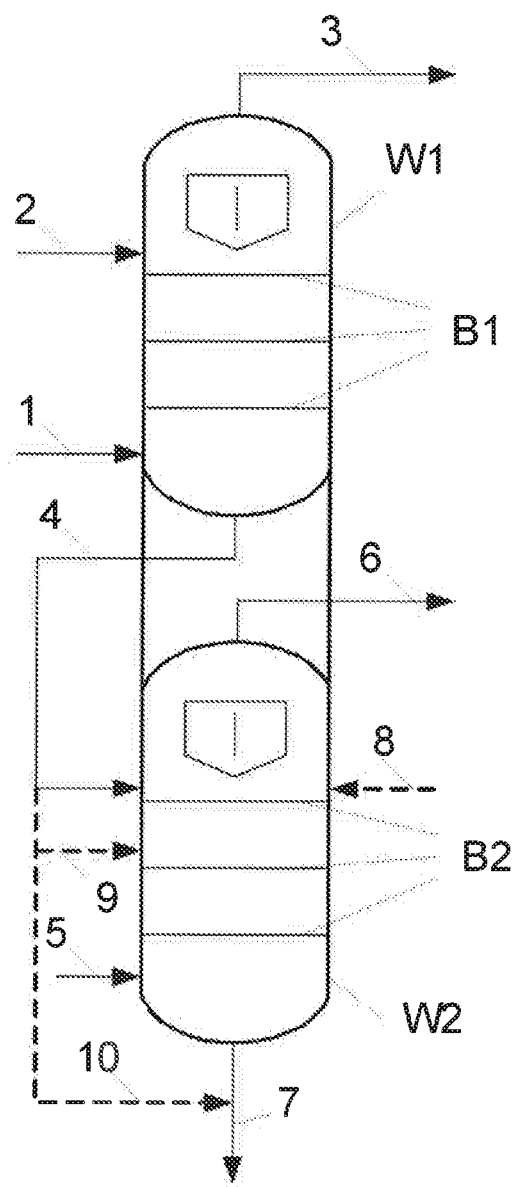

METHOD AND DEVICE FOR SEPARATING OFF ELECTROLYTES FROM SYNTHESIS GASES

The invention relates to a method for separating off an electrolyte from a first synthesis gas and a second synthesis gas, each containing an electrolyte, wherein each of the two synthesis gases is subjected in a scrubbing column to a water scrubbing, in which a substantially electrolyte-free synthesis gas and also a scrubbing water loaded with the electrolyte that has been separated off are obtained.

In addition, the invention relates to a device for carrying out the method according to the invention.

An electrolyte is taken to mean a chemical compound which when dissolved in water dissociates into ions, and which therefore usually has a high water solubility. Examples of electrolytes are ammonia and hydrogen chloride.

Synthesis gases are gas mixtures that are produced on an industrial scale, for example by steam reforming, or partial oxidation, from carbon-containing starting materials such as natural gas, liquid gas, naphtha, heavy oil or coal. They consist for the predominant part of hydrogen, carbon monoxide and carbon dioxide but also contain, in smaller amounts, sulphur components, and also ammonia and hydrogen chloride. In order to obtain economically utilizable products such as hydrogen, carbon monoxide, oxo gas or a sulphur-free fuel gas predominantly consisting of hydrogen, carbon monoxide and carbon dioxide for a gas turbine, a synthesis gas is frequently subjected to a methanol scrubbing in which primarily carbon dioxide and sulphur components are separated off.

Electrolytes such as hydrogen chloride and, in particular, ammonia, can form poorly soluble compounds with methanol and therefore must not pass into the scrubbing medium circuit of the methanol scrubber, since there they would lead to blockages. Therefore, a water scrubber is connected upstream of a methanol scrubber for treating synthesis gases, in which water scrubber, electrolytes present in the synthesis gas are separated off with the aid of scrubbing water. Customarily, the water scrubbing is carried out in a scrubbing column in which demineralized water (deionate) or boiler feed water cooled to temperatures of approximately −40° C. is introduced as scrubbing water. The scrubbing water loaded with the electrolytes that are separated off from the synthesis gas is taken off from the scrubbing column and treated in such a manner that it can be used again or given off as wastewater. The minimum scrubbing water volume required for separating off the electrolytes from a synthesis gas is, owing to the high water solubility of the electrolytes, substantially lower than the actual water requirement of the water scrubber which is determined by the minimum trickling density of the column trays.

In order to generate a plurality of products simultaneously from a synthesis gas, the synthesis gas can be subdivided into a plurality of substreams which are then treated differently. If, for example, a hydrogen product and a fuel gas for a gas turbine are obtained from the synthesis gas, the synthesis gas is divided into a first substream and a second substream, from which only one is converted by water-gas shift, in order to react carbon monoxide with water to form hydrogen and carbon dioxide. Owing to the pressure drop occurring during the water-gas shift, the non-converted substream has a pressure which is about 2 to 4 bar higher than the pressure of the converted substream. To separate off sulphur components and/or carbon dioxide, the two synthesis gases are scrubbed separately from one another in two methanol scrubbers operated in parallel. A water scrubber is connected upstream of each of the two methanol scrubbers, in which water scrubber in each case one substream is scrubbed with cooled deionate or boiler feed water.

The water scrubber represents a considerable cost factor, not least because of the provision of fresh scrubbing water and the disposal or treatment of the loaded scrubbing water, which impairs the economic efficiency of the production of products from synthesis gases.

The object of the present invention is therefore to specify a method of the type described at the outset and also a device for carrying it out, by which electrolytes can be separated off from synthesis gases at lower costs than can be achieved in the prior art.

This object is achieved in that, for the scrubbing of the second synthesis gas, at least a part of the scrubbing water that was loaded with an electrolyte that has been separated off in the scrubbing of the first synthesis gas is used as scrubbing medium.

The invention makes use of the fact that, owing to the operating requirements of the scrubbing column, only a fraction of the absorption capacity of the scrubbing water used in the scrubbing of the first synthesis gas is exploited, and the loaded scrubbing medium is therefore still capable of absorbing further amounts of electrolyte.

The requirement for scrubbing water with constant quality of the electrolyte separation can be markedly decreased compared with the prior art by the method according to the invention. As a consequence, both the costs for providing the non-loaded scrubbing water and also those for preparing or disposing of the loaded scrubbing water decrease.

Preferably, the second synthesis gas is scrubbed solely with scrubbing water which was loaded during the scrubbing of the first synthesis gas with an electrolyte. However, use of non-loaded scrubbing water in addition should not be excluded. This can be logical, not only when the amount of the loaded scrubbing water is insufficient for complete scrubbing of the second synthesis gas, but also, for instance, when the loading of the scrubbing water fed from the first scrubber is too high in order to separate off the electrolytes from the second synthesis gas to the extent required. The non-loaded scrubbing water can be added to the loaded scrubbing water before introduction thereof into the scrubbing column used for scrubbing the second synthesis gas, or independently thereof fed to the scrubbing column. In the case of separate feed, the non-loaded scrubbing medium is expediently introduced into the scrubbing column at a higher position than the loaded scrubbing medium.

To transfer scrubbing water loaded during the scrubbing of the first synthesis gas to the scrubbing column used for scrubbing the second synthesis gas, a pump can be used. Alternatively, or in addition thereto, the first synthesis gas can be scrubbed at a higher pressure than the second synthesis gas, in such a manner that the pressure difference existing between the two scrubbers is utilizable in order to feed scrubbing water loaded during the scrubbing of the first synthesis gas to the second water scrubber. In addition, it is possible to position the scrubbing column used for scrubbing the first synthesis gas higher than the scrubbing column in which the second synthesis gas is scrubbed, and to feed loaded scrubbing water to the scrubber of the second synthesis gas with the aid of gravity.

Particularly preferably, the method according to the invention can be used when a first and second substream are formed from a synthesis gas, in order to generate a hydrogen product and a fuel gas for a gas turbine, wherein the first substream forms the first synthesis gas, whereas the second synthesis gas is formed by converting the second substream by water-gas shift.

The method according to the invention is suitable for separating off a multiplicity of electrolytes. Preferably, however, it is used to separate off ammonia and/or hydrogen chloride from synthesis gases.

In addition, the invention relates to a device for separating off an electrolyte from synthesis gases having a first scrubbing column in which a first synthesis gas can be subjected to a water scrubbing, and a second scrubbing column in which a second synthesis gas containing an electrolyte can be subjected to a water scrubbing, wherein each of the scrubbing columns has a feed appliance for scrubbing water and take-off appliances for scrubbed synthesis gas and also for scrubbing water loaded with an electrolyte that has been separated off.

In terms of the device, the object in question is achieved according to the invention in that the take-off appliance for loaded scrubbing water of the first scrubbing column is connected to the feed appliance for scrubbing water of the second scrubbing column in such a manner that at least a part of the scrubbing water loaded with an electrolyte that has been separated off in the first scrubbing column during the scrubbing of the first synthesis gas can be used in the scrubbing of the second synthesis gas in the second scrubbing column.

Expediently, the first scrubbing column is positioned higher than the second scrubbing column, in such a manner that gravity can be used to transfer scrubbing water loaded with an electrolyte in the first scrubbing column into the second scrubbing column. A particularly space-saving variant results from the arrangement of the two scrubbing columns vertically one above the other.

Preferably, the second scrubbing column is constructed having a further feed appliance for scrubbing water, via which, in addition to scrubbing water loaded in the first scrubbing column, non-loaded scrubbing water can also be fed to the second scrubbing column. Expediently, the further feed appliance for the non-loaded scrubbing water is arranged in such a manner that the non-loaded scrubbing water is introducible at a higher position than the scrubbing water loaded in the first scrubbing column is introducible into the second scrubbing column.

Hereinafter, the invention will be explained in more detail with reference to an exemplary embodiment shown schematically in FIG. 1.

FIG. 1 shows a preferred variant of the device according to the invention in which an electrolyte is separated off from two synthesis gases in parallel.

Via line 1, a first synthesis gas containing ammonia and/or hydrogen chloride is applied to the first scrubbing column W1 in the lower part thereof, where it is conducted upwardly and in this case is brought into intense contact with non-loaded scrubbing water 2 fed at the top of the scrubbing column W1. As a result of the water scrubbing, a first synthesis gas 3 that is substantially free from ammonia and/or hydrogen chloride, and also a scrubbing water 4 loaded with ammonia and/or hydrogen chloride separated off from the first synthesis gas 1 is taken off from the scrubbing column W1. The amount of the scrubbing water 2 used in the first scrubbing column W1 is determined by the minimum trickling density of the column trays B1 and is therefore considerably greater than the minimum amount of scrubbing water which is required for scrubbing out ammonia and/or hydrogen chloride, for which reason the loaded scrubbing water 4 still has absorption capacity for ammonia and/or hydrogen chloride.

With the support of gravity, the loaded scrubbing water 4 is fed to the top of the second scrubbing column W2 that is arranged vertically beneath the first scrubbing column W1, in which second scrubbing column W2 it is used to scrub the second synthesis gas 5 and likewise free it from ammonia and/or hydrogen chloride. From the top of the second scrubbing column, therefore, a second synthesis gas 6 substantially free from ammonia and/or hydrogen chloride is taken off, and from the sump thereof a scrubbing water 7 loaded with ammonia and/or hydrogen chloride separated off from the two synthesis gases 2 and 5.

In order to achieve a higher degree of separation, alternatively, non-loaded scrubbing water 8 can be conducted above the uppermost of the column trays B2 into the second scrubbing column W2, into which, at a lower position, only a part 9 of the scrubbing water 4 loaded in the first scrubbing column W1 is introduced. The remainder 10 of the scrubbing water 4 loaded in the first scrubbing column W1 is combined directly with the scrubbing water 7 loaded in the second scrubbing column.

The invention claimed is:

1. A method for separating off an electrolyte from a first synthesis gas and a second synthesis gas, each containing an electrolyte, said method comprising:
   subjecting each of the two synthesis gases to a water scrubbing in a first water scrubber column and a second water scrubber column, respectively, wherein a substantially electrolyte-free synthesis gas and a scrubbing water loaded with electrolyte are separated and obtained,
   wherein at least a part of the scrubbing water that is loaded with an electrolyte separated off in the scrubbing of the first synthesis gas is used as scrubbing medium for the scrubbing of the second synthesis gas, and
   wherein said electrolyte in said first and second synthesis gases is ammonia and/or hydrogen chloride.

2. The method according to claim 1, wherein the first synthesis gas is scrubbed at a higher pressure than the second synthesis gas and scrubbing water that is loaded in the first water scrubber column is supplied to the second water scrubber column with the aid of the pressure difference.

3. The method according to claim 1, wherein scrubbing water that is loaded during the scrubbing of the first synthesis gas is fed with the aid of gravity to the second water scrubber column.

4. The method according to claim 1, wherein, for producing the first synthesis gas and the second synthesis gas, a synthesis gas stream is divided into a first and second substream, wherein the first substream forms the first synthesis gas, whereas the second synthesis gas is formed by converting the second substream by water-gas shift.

5. The method according to claim 1, wherein said first water scrubber column and said second water scrubber column are each positioned upstream of a methanol scrubber.

6. The method according to claim 1, wherein said first water scrubber column is positioned above said second water scrubber column.

7. The method according to claim 1, further comprising introducing non-loaded scrubbing water into the second water scrubber column.

8. The method according to claim 7, wherein said second water scrubber column contains column trays and said non-loaded scrubbing water is introduced into the second water scrubber column above the uppermost of said column trays, and, at a lower position, part of the scrubbing water loaded in the in the first water scrubber column is introduced, and wherein the remainder of the scrubbing water loaded in the first water scrubber column is combined directly with loaded scrubbing water removed from the second water scrubber column.

9. A method for separating off an electrolyte from a first synthesis gas and a second synthesis gas, each containing an electrolyte, said method comprising:
- subjecting each of the two synthesis gases to a water scrubbing in a first water scrubber column and a second water scrubber column, respectively, wherein a substantially electrolyte-free synthesis gas and a scrubbing water loaded with electrolyte are separated and obtained,
- wherein at least a part of the scrubbing water that is loaded with an electrolyte separated off in the scrubbing of the first synthesis gas is used as scrubbing medium for the scrubbing of the second synthesis gas, and
- wherein said first water scrubber column and said second water scrubber column are each positioned upstream of a methanol scrubber.

* * * * *